(12) United States Patent
Shindo et al.

(10) Patent No.: US 7,744,227 B2
(45) Date of Patent: Jun. 29, 2010

(54) PROJECTOR INCLUDING A TURN TABLE FOR SHIFTING A LENS BARREL

(75) Inventors: Hiroyuki Shindo, Matsumoto (JP); Takeshi Ishikawa, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 794 days.

(21) Appl. No.: 11/611,463

(22) Filed: Dec. 15, 2006

(65) Prior Publication Data

US 2007/0195292 A1 Aug. 23, 2007

(30) Foreign Application Priority Data

Feb. 20, 2006 (JP) .............................. 2006-042016

(51) Int. Cl.
G03B 21/14 (2006.01)
G03B 21/22 (2006.01)
G02B 27/00 (2006.01)
(52) U.S. Cl. .................... 353/101; 353/119; 359/823
(58) Field of Classification Search ................ 353/101, 353/100, 119, 122; 359/811, 819, 822, 823
See application file for complete search history.

(56) References Cited

U.S. PATENT DOCUMENTS

| 6,364,491 | B1 * | 4/2002 | Okada et al. ................. 353/101 |
| 6,793,346 | B2 | 9/2004 | Nakano et al. |
| 7,159,991 | B2 * | 1/2007 | Ito ................................ 353/98 |
| 2006/0092384 | A1 * | 5/2006 | Kuroda ........................... 353/69 |
| 2006/0203211 | A1 * | 9/2006 | Kim ............................. 353/101 |
| 2006/0256303 | A1 * | 11/2006 | Hamada ....................... 353/101 |

FOREIGN PATENT DOCUMENTS

| CN | 1434345 A | 8/2003 |
| JP | A-2001-194572 | 7/2001 |
| JP | A-2004-012973 | 1/2004 |
| JP | A-2004-045809 | 2/2004 |

OTHER PUBLICATIONS

MP3222, 1994-2008 China Academic Journal Electric Publishing House, http://www.cnki.net, Oct. 2004.

* cited by examiner

Primary Examiner—Georgia Y Epps
Assistant Examiner—Magda Cruz
(74) Attorney, Agent, or Firm—Oliff & Berridge, PLC

(57) ABSTRACT

A projector includes an image forming device, a projection lens for projecting an image produced by the image forming device, and an external case which accommodates the image forming device and at least a part of the projection lens and has an opening through which a light emission end of the projection lens is exposed. The projection lens has a lens barrel and a plurality of lenses equipped within the lens barrel. The lens barrel has a fixed part and a movable part. A turn table for shifting the movable part of the lens barrel in the direction of the optical axis of the projection lens is provided. The direction of the rotation axis of the turn table is substantially perpendicular to the optical axis of the projection lens. The top surface of the turn table is exposed through the outer surface of the external case.

8 Claims, 15 Drawing Sheets

PROJECTOR INCLUDING A TURN TABLE FOR SHIFTING A LENS BARREL

BACKGROUND

1. Technical Field

The present invention relates to a projector which projects images using a liquid crystal panel or other light modulators.

2. Related Art

A projection lens of a projector has a focusing mechanism for controlling focus of a projection image, and a zooming mechanism for controlling projection magnification of a projection image. These focusing and zooming mechanisms vary focus and projection magnification by holding a part of a lens barrel of the projection lens and rotating the part around the optical axis (see JP-A-2001-194572 and JP-A-2004-45809). In addition, there is a projector capable of indirectly performing focusing and zooming operations by rotating an operation member which is adjacent to and coaxial with a projection lens instead of directly rotating a part of the lens barrel of the projection lens (see JP-A-2004-12973).

According to the above controlling method which directly rotates a part of the lens barrel of the projection lens, a projection such as a lever provided on the lens barrel of the projection lens is operated to rotate the part of the lens barrel. In this structure, however, it is difficult to widen the movable range of the lever, and it is necessary to touch the projection lens when operating the lever. Thus, the maneuverability of the lever is unsatisfactory. In addition, since the lever is a projection, limitations to the size and external appearance of the projector increase.

According to the controlling method which indirectly rotates the lens barrel using the operation member, a lever-shaped projection is operated similarly to the above method. Therefore, widening the movable range of the projection is difficult, and the maneuverability of the lever is undesirable. Moreover, since the operation member is disposed adjacent to the projection lens in the lateral direction, focusing and zooming operations cannot be easily performed depending on the position of the user sitting on the seat.

SUMMARY

Accordingly, it is an advantage of some aspects of the invention to provide a projector capable of enhancing the maneuverability of focusing and zooming operations without imposing limitations to the size and external appearance of the projector.

In order to provide the above advantage, a projector according to an aspect of the invention includes: (a) an image forming device, (b) a projection lens for projecting an image produced by the image forming device, and (c) an external case which accommodates the image forming device and at least a part of the projection lens and has an opening through which a light emission end of the projection lens is exposed. The projection lens has (a1) a lens barrel and (a2) a plurality of lenses equipped within the lens barrel. The lens barrel has (a1-1) a fixed part and (a1-2) a movable part. The projector includes a turn table for shifting the movable part of the lens barrel in the direction of the optical axis of the projection lens. The direction of the rotation axis of the turn table is substantially perpendicular to the optical axis of the projection lens. The top surface of the turn table is exposed through the outer surface of the external case.

In the projector according to the above aspect of the invention, the direction of the rotation axis of the turn table for shifting the movable part of the lens barrel is substantially perpendicular to the optical axis of the projection lens, and the top surface of the turn table is exposed through the outer surface of the external case. Thus, the movable part of the projection lens can be shifted by the desired amount without necessity for directly touching the projection lens by rotating the turn table by the necessary amount. In this case, since the top surface of the turn table having a relatively wide area exposed through the outer surface of the external case is rotated, the maneuverability for operating the projection lens by the user can be improved. Moreover, since the top surface of the turn table extends parallel to the optical axis of the projection lens, the turn table and the projection lens can be efficiently accommodated within a narrow space. Thus, limitations to the size, the external appearance and other conditions of the projector can be reduced.

In an example of the projector according to the above aspect of the invention, the movable part varies the focus condition of the projection lens. In this case, the focusing operation can be performed by rotating the top surface of the turn table.

In another example of the projector according to the above aspect of the invention, the movable part varies the projection magnification of the projection lens. In this case, the zooming operation can be performed by rotating the top surface of the turn table.

In still another example of the projector according to the above aspect of the invention, the movable part has a focus varying section for varying the focus condition of the projection lens and a magnification varying section for varying the projection magnification of the projection lens, and the turn table has a first part for shifting the focus varying section and a second part for shifting the magnification varying section. In this case, the focusing operation can be performed by operating the first part and shifting the focus varying section, and the zooming operation can be performed by operating the second part and shifting the magnification varying section.

In still another example of the projector according to the above aspect of the invention, the top surface of the turn table is exposed through the top board of the external case. In this case, since the turn table is disposed on the external case which is easily accessed from the surroundings, the focus condition and projection magnification can be controlled from any locations around the projector.

In still another example of the projector according to above aspect of the invention, a transmission mechanism for transmitting the rotation of the turn table to the movable part is provided between the turn table and the movable part. In this case, the rotation of the turn table is converted into movement in the axial direction of the movable part or other movements by the transmission mechanism.

In still another example of the projector according to the above aspect of the invention, the transmission mechanism is a guiding mechanism including a guide pin fixed to the movable part of the lens barrel and a guide groove formed on the turn table and allowing the guide pin to slide within the guide groove. In this case, the rotation of the turn table can be transmitted to the movable part by the simple guiding mechanism having the guide pin and the guide groove.

In still another example of the projector according to the above aspect of the invention, the transmission mechanism is a gear mechanism including a first gear part provided on the movable part of the lens barrel and a second gear part provided on the turn table. In this case, the rotation of the turn table can be transmitted to the movable part by the simple gear mechanism having the first gear part and the second gear part.

BRIEF DESCRIPTION OF THE DRAWINGS

The invention will be described with reference to the accompanying drawings, wherein like numbers refer to like elements.

DESCRIPTION OF EXEMPLARY EMBODIMENTS

First Embodiment

Figure 1:
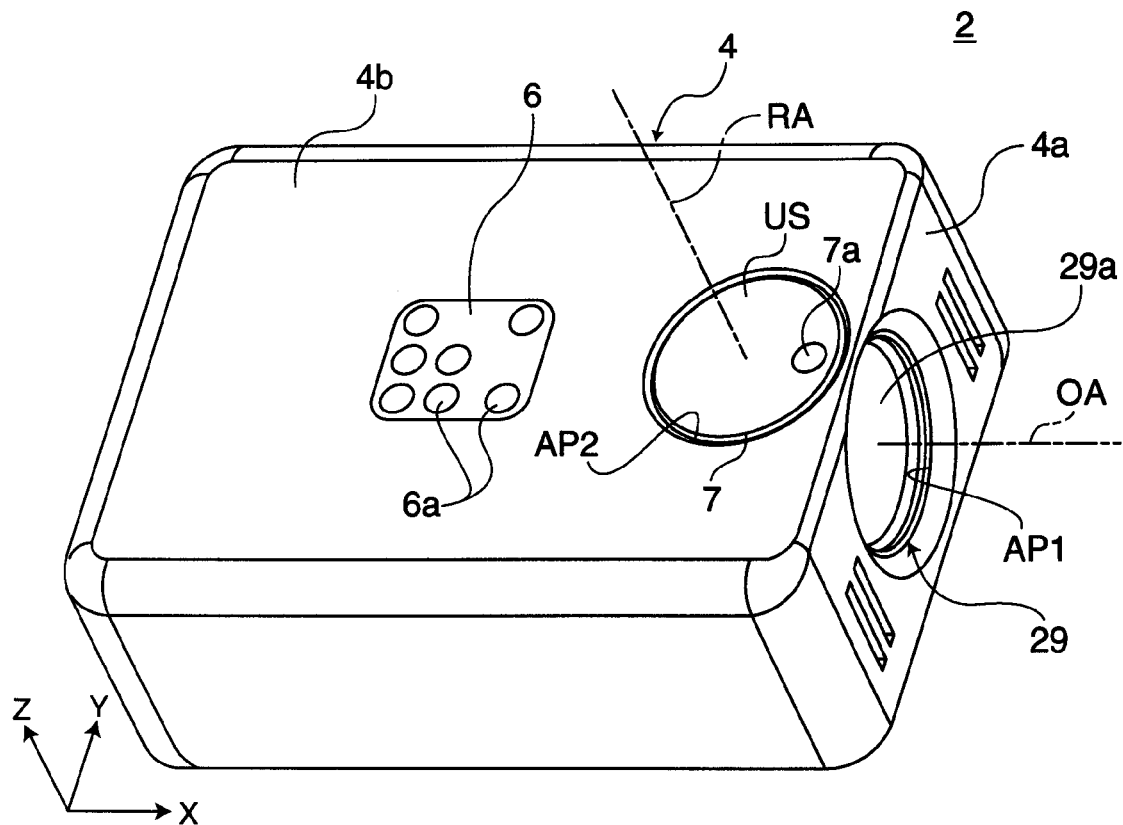
FIG. 1 is a perspective view of an external appearance of a projector in a first embodiment.
Figure 2:
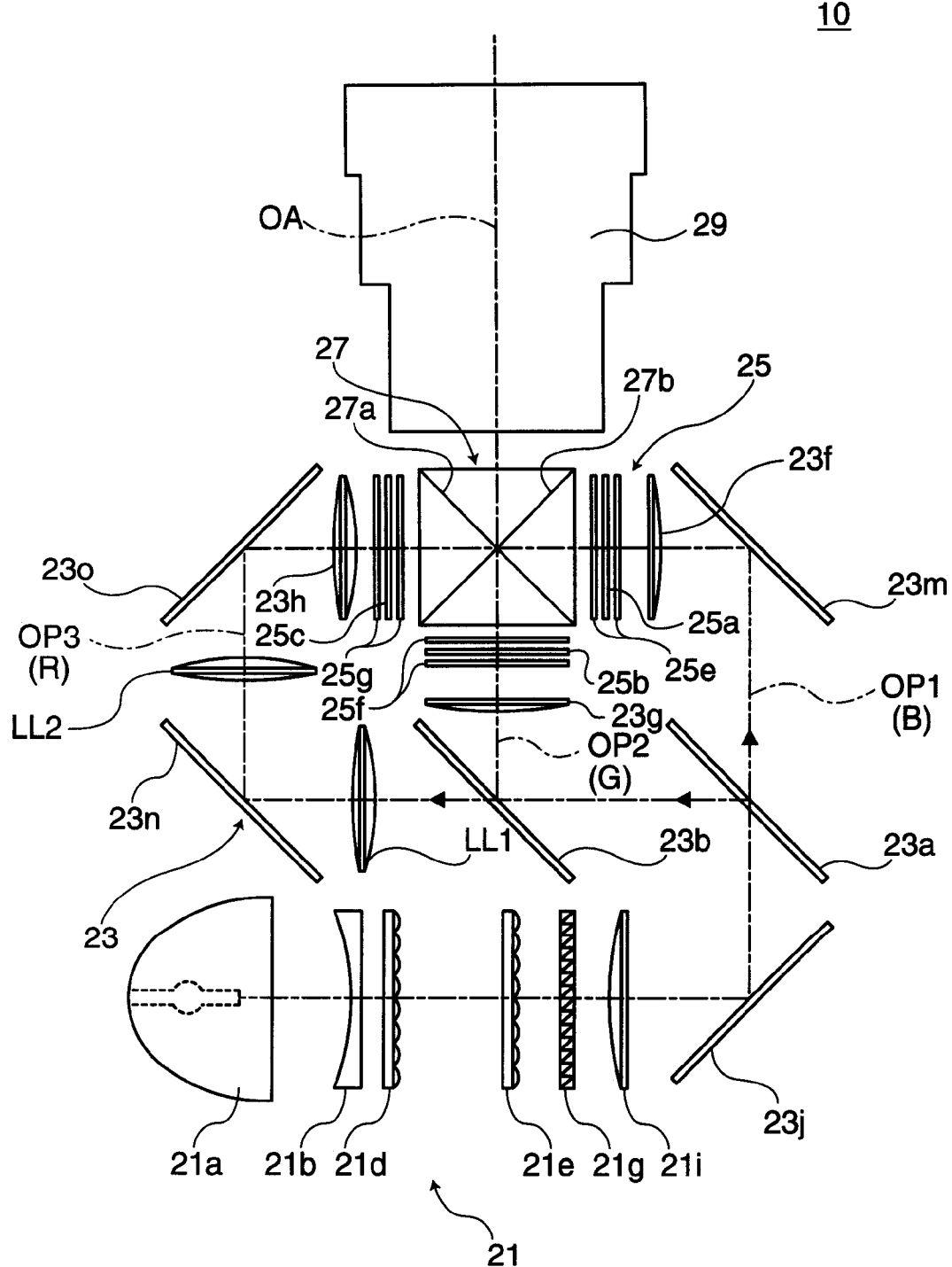
FIG. 2 illustrates an optical system of the projector in the first embodiment.

FIG. 1 is a perspective view of an external appearance of a projector in a first embodiment. FIG. 2 is a plan view illustrating an optical system incorporated in the projector shown in FIG. 1.

A projector 2 includes a picture optical system 10, which is also called an optical engine unit, and a circuit unit (not shown) for controlling the operation of the entire apparatus within an external case 4 covering the entire projector 2.

The external case 4 has an external appearance of rectangular parallelepiped, and has an opening AP1 at the center of a front surface 4a of the external case 4. A distal end 29a as the light emission end of a projection lens 29 embedded in the external case 4 is exposed through the opening AP1. An optical axis OA of the projection lens 29 extends in the direction of the X axis which is parallel with a top board 4b. Images from the projector 2 are projected on a screen (not shown) disposed before the projector 2 in the +X axis direction with appropriate magnification.

Figure 3:
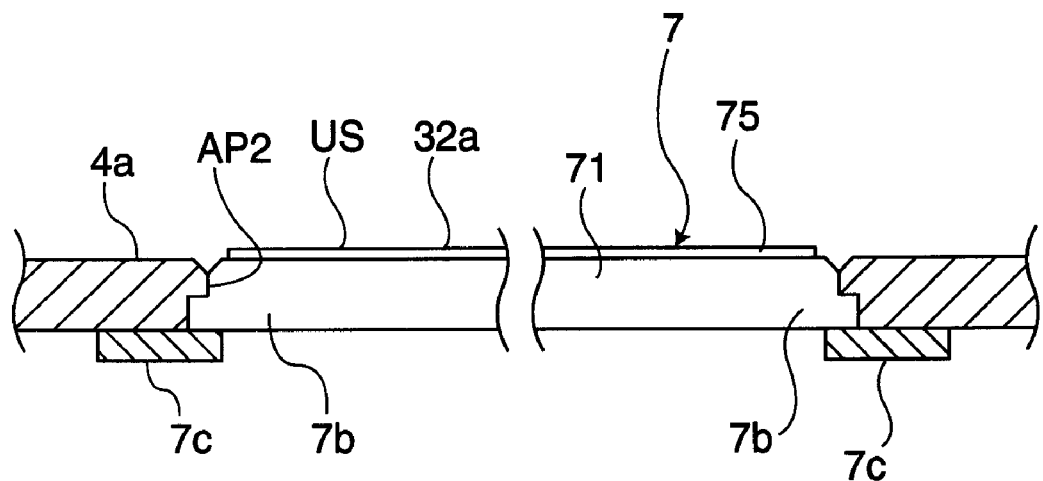
FIG. 3 is a partially enlarged cross-sectional view showing a fixing method of a turn table.

An operation panel 6 is provided at the center of the top board 4b of the external case 4. Various types of buttons 6a for controlling the operation conditions of the projector 2 are appropriately disposed on the operation panel 6. An opening AP2 is formed on the top board 4b near the front surface 4a. As illustrated in FIG. 3, a turn table 7 is attached to the opening AP2 such that the turn table 7 is embedded in the opening AP2, and a top surface US of the turn table 7 is exposed through the opening AP2. The turn table 7 is a disk-shaped component which is formed by affixing a main body 71 and an upper plate 75. An edge 7b of the turn table 7 is sandwiched between the top board 4b and an annular fixing member 7c and slides between the edge 7b and the fixing member 7c. The turn table 7 is supported by the top board 4b by this method, and turns around its axis within a plane parallel with the top board 4b. That is, the turn table 7 can revolve around a rotation axis RA which is parallel with the Z axis. The turn table 7 can be rotated by the operation of the user, and a movable part of the projection lens 29 or a lens element supported by this movable part can be shifted in the direction of the optical axis OA in accordance with the rotation of the turn table 7 as will be described later. The focus condition of the projection lens 29 is controlled by this mechanism. A mark 7a formed at one position of the periphery of the top surface US of the turn table 7 is provided so as to check the rotation position of the turn table 7.

The picture optical system 10 shown in FIG. 2 is now explained. The picture optical system 10 has a light source device 21 for producing source light, a color separation optical system 23 for separating source light emitted from the light source device 21 into three lights in red, green and blue, a light modulation unit 25 illuminated by illumination lights in the respective colors emitted from the color separation system 23, a cross dichroic prism 27 for synthesizing image lights in the respective colors released from the light modulation unit 25, and the projection lens 29 as a projection optical system for projecting the image light having passed through the cross dichroic prism 27 on the screen (not shown). The light source device 21, the color separation optical system 23, the light modulation unit 25, and the cross dichroic prism 27 constitute an image forming device for producing image light to be projected on the screen.

The light source device 21 of the picture optical system 10 has a light source lamp 21a, a concave lens 21b, a pair of fly-eye optical systems 21d and 21e, a polarization conversion member 21g, and a superposing lens 21i. The light source lamp 21a is constituted by a high pressure mercury lamp, for example, and has a concave mirror for collecting source light emitted from the light source and releasing the light toward the front. The concave lens 21b has a function for collimating the source light emitted from the light source lamp 21a, but this lens 21b can be eliminated. The pair of the fly-eye optical systems 21d and 21e are constituted by a plurality of element lenses disposed in matrix. The source light which has been emitted from the light source lamp 21a and passed through the concave lens 21b is divided by the plural element lenses, and each of the element lenses converges and diverges the source light. The polarization conversion member 21g converts the source lights released from the fly-eye optical system 21e into only S-polarized lights which are perpendicular to the surface of the sheet of FIG. 1, for example, and supplies the converted lights to the next optical system. The superposing lens 21i appropriately converges the entire illumination lights having passed through the polarization conversion member 21g such that the illumination lights superposed on each other can illuminate the light modulators for the respective colors. That is, the illumination lights having passed through the fly-eye optical systems 21d and 21e and the superposing lens 21i pass through the color separation optical system 23 which will be described below in detail, and are superposed and uniformly illuminate the light modulators for the respective colors provided in the light modulation unit 25. i.e., liquid crystal panels 25a, 25b and 25c for the respective colors.

The color separation optical system 23 has first and second dichroic mirrors 23a and 23b, three field lenses 23f, 23g and 23h as correction optical systems, and reflection mirrors 23j, 23m, 23n and 23o. The color separation optical system 23 constitutes the illumination device with the light source device 21. The first dichroic mirror 23a reflects red and green lights in the three color lights of red, green and blue, and transmits blue light. The second dichroic mirror 23b reflects green light of the two lights in red and green having entered thereinto and transmits red light. In the color separation optical system 23, the optical path of the source light which is substantially white from the light source device 21 is bended by the reflection mirror 23j, and the source light enters the first dichroic mirror 23a. The blue light having passed through the first dichroic mirror 23a is reflected by the reflection mirror 23m and enters the field lens 23f as S-polarized light without change, for example. The green light having been reflected by the first dichroic mirror 23a and again reflected by the second dichroic mirror 23b enters the field lens 23g as S-polarized light without change, for example. The red light having passed through the second dichroic mirror 23b passes through lenses LL1 and LL2 and the reflection mirrors 23n and 23o and enters the field lens 23h for controlling the angle of incidence as S-polarized light without change, for example. The lenses LL1 and LL2 and the field lens 23h constitute a relay optical system. The relay optical system has a function for transmitting the image produced by the first lens LL1 to the field lens 23h via the second lens LL2 substantially as it is.

The light modulation unit 25 has the three liquid crystal panels 25a through 25c each of which is a liquid crystal device, and three pairs of polarization filters 25e, 25f and 25g. The crystal panels 25a through 25c are interposed between the pairs of the polarization filters 25e, 25f and 25g, respectively. The liquid crystal panel 25a for blue light and the pair of the polarization filters 25e and 25e between which the liquid crystal panel 25a is interposed constitute a liquid crystal light valve for blue light which two-dimensionally modulates luminance of blue light based on the image data, which blue light is included in the image lights after luminance modulation. Similarly, the liquid crystal panel 25b for green light and the corresponding polarization filters 25f and 25f constitute a liquid crystal valve for green light, and the liquid crystal panel 25c for red light and the corresponding polarization filters 25g and 25g constitute a liquid crystal valve for red light.

The blue light branched after passing through the first dichroic mirror 23a of the color separation optical system 23 enters the first liquid crystal panel 25a for blue light via the field lens 23f. The green light branched after reflected by the second dichroic mirror 23b of the color separation optical system 23 enters the second liquid crystal panel 25b for green light via the field lens 23g. The red light branched after passing through the second dichroic mirror 23b enters the third liquid crystal panel 25c for red light via the filed lens 23h. The respective liquid crystal panels 25a through 25c are non-emission-type light modulators for modulating the spatial intensity distributions of the entering illumination lights.

The lights in three colors entering the corresponding liquid crystal panels 25a through 25c are modulated in response to driving signals or image signals inputted to the respective liquid crystal panels 25a through 25c as electric signals. During modulation, by the polarization filters 25e, 25f and 25g, the polarization directions of the illumination lights entering the corresponding liquid crystal panels 25a through 25c are controlled, and the component lights in predetermined polarization directions are extracted as image lights from the modulation lights emitted from the respective liquid crystal panels 25a through 25c.

The cross dichroic prism 27 is a light synthesizing member. The cross dichroic prism 27 is a substantially square component in the plan view formed by combining four rectangular prisms. A pair of dielectric multilayer films 27a and 27b crossing each other in the shape of X are formed along the boundaries of the rectangular prisms. The first dielectric multilayer film 27a reflects blue light, while the other second dielectric multilayer film 27b reflects red light. The cross dichroic prism 27 reflects blue light coming from the liquid crystal panel 25a by the first dielectric multilayer film 27a and emits the blue light to the right in the light advancing direction. The cross dichroic prism 27 guides the green light coming from the liquid crystal panel 25b in the straight-advancing direction and emits the green light via the dielectric multilayer films 27a and 27b. The cross dichroic prism 27 reflects the red light coming from the liquid crystal panel 25c by the second dielectric multilayer film 27b and emits the red light to the left in the light advancing direction.

The projection lens 29 projects the image light in color produced by synthesis in the cross dichroic prism 27 on the screen (not shown) with predetermined magnification. More specifically, color dynamic images and color still images with predetermined magnification corresponding to the driving signals or the image signals inputted to the respective liquid crystal panels 25a through 25c are projected on the screen.

Figure 4:
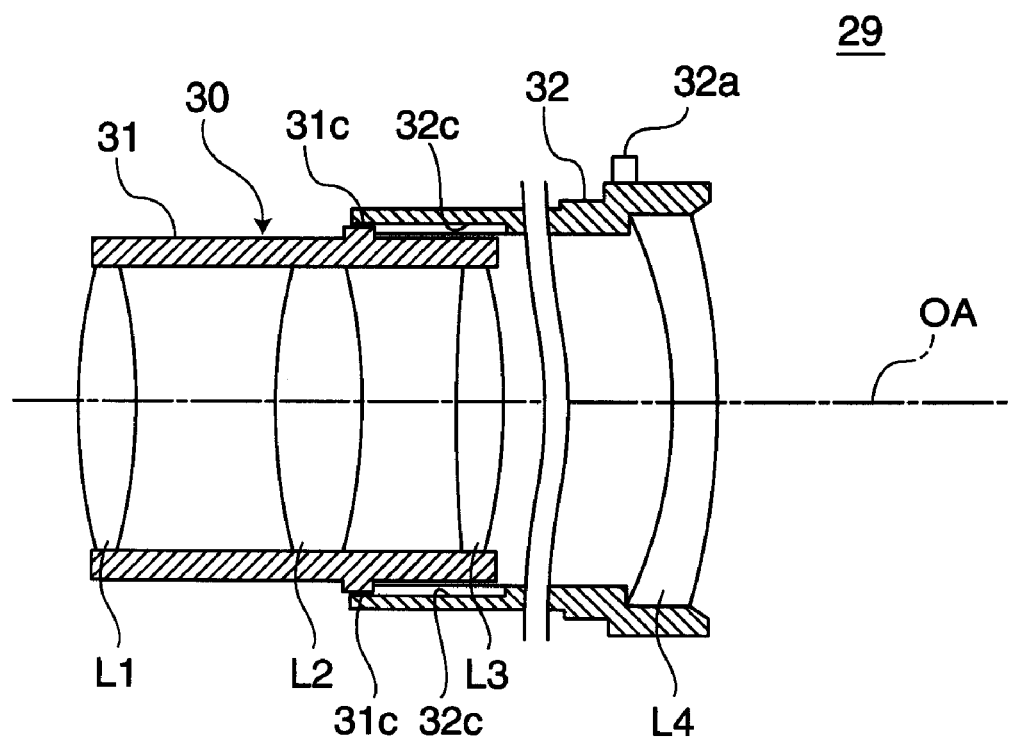
FIG. 4 is a side cross-sectional view illustrating an internal structure of a projection lens.

FIG. 4 is a side cross-sectional view illustrating the structure of the projection lens 29. The projection lens 29 has a plurality of lenses L1 through L4 within a lens barrel 30 such that the lenses L1 through L4 are fixed thereto. The lens barrel 30 is constituted by two cylindrical parts 31 and 32. The first cylindrical part 31 at the root is a fixed component of the lens barrel 30, and is secured to the external case 4 shown in FIG. 1. The second cylindrical part 32 at the distal end is a movable component of the lens barrel 30, and engages with the outer circumference of the first cylindrical part 31 such that the second cylindrical part 32 can smoothly slide in the direction of the optical axis OA. When the second cylindrical part 32 shifts along the optical axis OA toward the root, for example, the focus on the screen moves away, that is, the lens is focused on the screen disposed far away. When the second cylindrical part 32 shifts along the optical axis OA toward the distal end, the focus on the screen moves closer, that is, the lens is focused on the screen disposed nearer. In FIG. 4, the lenses L1 through L3 are fixed to the first cylindrical part 31, and the lens L4 is fixed to the second cylindrical part 32. However, this arrangement is only an example and can be appropriately changed in accordance with the applications of the projector 2.

Figure 5:
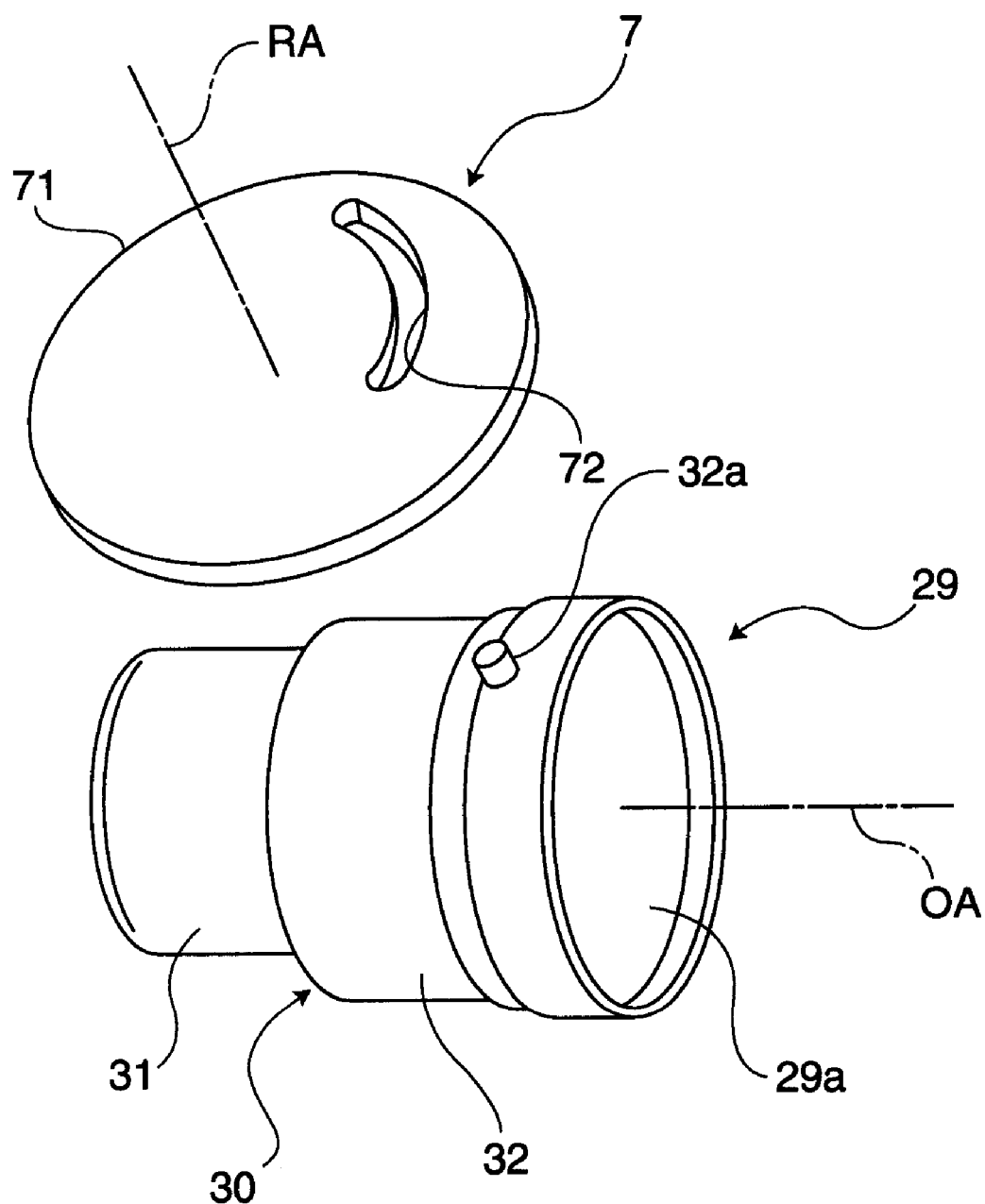
FIG. 5 is a perspective view illustrating a disassembled transmission mechanism and other components incorporated in the projector shown in FIG. 1.
Figure 6A:
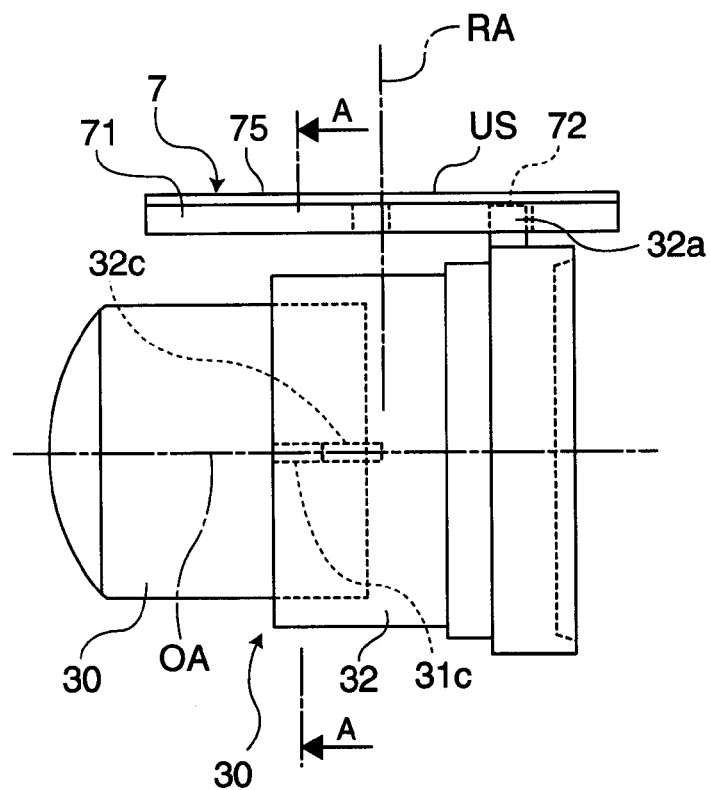
FIG. 6A is a side view of the transmission mechanism and other components incorporated in the projector shown in FIG. 1.
Figure 6B:
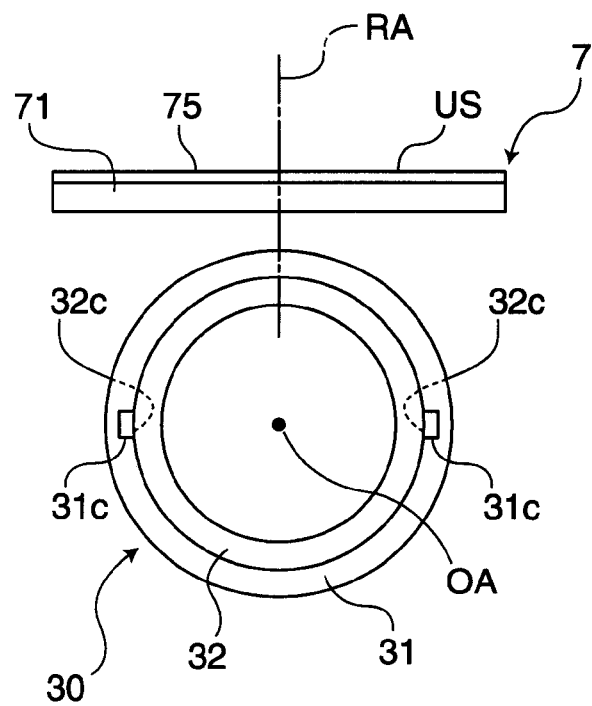
FIG. 6B is a cross-sectional view taken along a line A-A in FIG. 6A as viewed in the direction indicated by arrows A.

FIG. 5 is a perspective view showing the interlocking structure of the projection lens 29 and the turn table 7. FIG. 6A is a side view showing the positioning of the projection lens 29 and the turn table 7, and FIG. 6B is a cross-sectional view taken along a line A-A as viewed in the direction of arrows shown in FIG. 6A.

The main body 71 of the turn table 7 has an elongate hole 72 which is curved and has a part of a spiral shape and a constant width. The second cylindrical part 32 of the projection lens 29 has a small cylindrical pin 32a disposed at a position of the second cylindrical part 32. The elongate hole 72 of the turn table 7 holds the pin 32a such that the pin 32a can slide within the hole 72. In this structure, the elongate hole 72 functions as a guide groove for guiding the pin 32a, and the pin 32a of the lens barrel 30 functions as a guide pin which is guided by the elongate hole 72 and shifted in the direction of the optical axis OA. That is, the elongate hole 72 as the guide groove and the pin 32a as the guide pin constitute a transmission mechanism for transmitting the rotation of the turn table 7 to the second cylindrical part 32 of the lens barrel 30.

Projections 31c extending in the direction of the optical axis OA are provided at two opposed positions of the outer circumference of the first cylindrical part 31. A pair of long and narrow grooves 32c which extend in the direction of the optical axis OA and has constant depth and width are formed at the corresponding positions on the inner circumference of the second cylindrical part 32. The projections 31c of the first cylindrical part 31 are guided by the grooves 32c of the second cylindrical part 32 such that the projections 31c can smoothly slide in the direction of the optical axis OA. Thus, when the second cylindrical part 32 is shifted toward the distal end or the root relative to the first cylindrical part 31, the position of the second cylindrical part 32 is maintained without causing rotation of the second cylindrical part 32 around the optical axis OA. Accordingly, the pin 32a can be kept at the upper position all the time.

According to the projector 2 in the first embodiment described above, the second cylindrical part 32 of the lens barrel 30 is expanded toward the distal end by the necessary amount by means of the elongate hole 72 and the pin 32a as the guide mechanism when the turn table 7 rotatably embedded in the external case 4 is rotated clockwise, for example. Also, the second cylindrical part 32 of the lens barrel 30 is contracted toward the root by the necessary amount by means of the elongate hole 72 and the pin 32a as the guide mechanism when the turn table 7 rotatably embedded in the external case 4 is rotated anticlockwise, for example. By this structure, the focus condition of the projection lens 29 is varied, and thus the focusing function can be performed using the turn table 7. Since the direction of a rotation axis RA of the turn table 7 is perpendicular to the optical axis OA of the projection lens 29 and the top surface US of the turn table 7 extends in the direction parallel to the optical axis OA, the turn table 7 and the projection lens 29 can be accommodated efficiently within a narrow space. Therefore, limitations to the size and external appearance of the projector 2 can be reduced.

The shape of the elongate hole 72 formed on the main body 71 of the turn table 7 is not limited to a part of a spiral shape as in the first embodiment. The elongate hole 72 can have various other shapes as long as they are smooth shapes.

Second Embodiment

Figure 7:
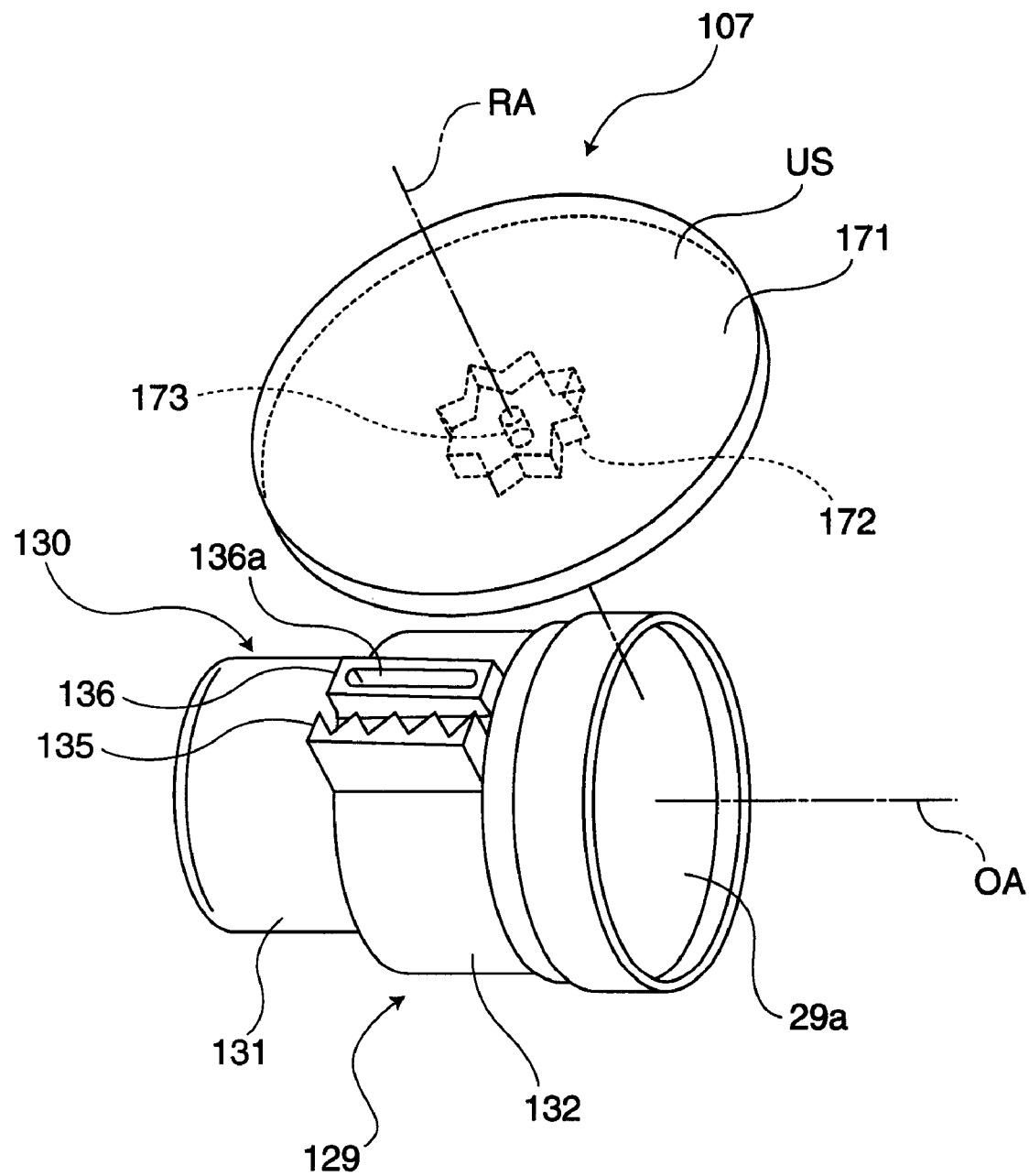
FIG. 7 is a perspective view showing a disassembled main part of a projector in a second embodiment.

FIG. 7 is a perspective view showing a part of a projector in a second embodiment. This figure corresponds to FIG. 5 of the first embodiment. The projector in the second embodiment is a modification of the projector in the first embodiment. Thus, similar reference numerals are given to similar components and the same explanation of those is not repeated. The parts not particularly discussed in the projector of the second embodiment are the parts similar to those of the projector in the first embodiment.

A pinion 172 as a gear unit is provided around the rotation axis RA on the back surface of a main body 171 of a turn table 107. A small cylindrical projection 173 is formed at the center of the pinion 172. A rack 135 as a gear unit extending in the direction of the optical axis OA and a guide groove member 136 which includes a groove 136a having a constant depth and a width are provided on the side of the second cylindrical part 132 of the lens barrel 130. The pinion 172 and the rack 135 constitute a transmission mechanism as a gear system operating through engagement therebetween. When the turn table 107 rotates, the pinion 172 revolves around the rotation axis RA. By the rotation of the pinion 172, the rack 135 moves in the direction of the optical axis OA. Thus, by the rotation of the turn table 107 around the rotation axis RA which is perpendicular to the top surface US, the second cylindrical part 132 of the lens barrel 130 can be expanded and contracted relative to the first cylindrical part 131 in the direction of the optical axis OA.

The projection 173 formed on the back surface of the turn table 107 is guided by the groove 136a of the guide groove member 136 provided on the side of the second cylindrical part 132. In this embodiment, the projection 173 disposed on the turn table 107 is fixed, and the guide groove member 136 smoothly slides in the direction of the optical axis OA. Thus, when the second cylindrical part 132 shifts such that it expands or contracts relative to the first cylindrical part 131, the projection 173 engages with the guide groove member 136 while maintaining the guide groove member 136 at the upper position all the time. Accordingly, the position of the second cylindrical part 132 can be maintained without causing rotation of the second cylindrical part 132 around the optical axis OA. That is, the engagement between the pinion 172 and the rack 135 can be maintained.

Similarly to the projector in the first embodiment, the second cylindrical part 132 of the lens barrel 130 of the projector in the second embodiment can be expanded or contracted by the necessary amount in the direction of the distal end by means of the rack 135 and the pinion 172 when the turn table 107 rotatably embedded in the external case 4 is rotated. Accordingly, the focus condition of the projection lens 129 can be varied, and thus the focusing function can be performed using the turn table 107.

Third Embodiment

Figure 8:
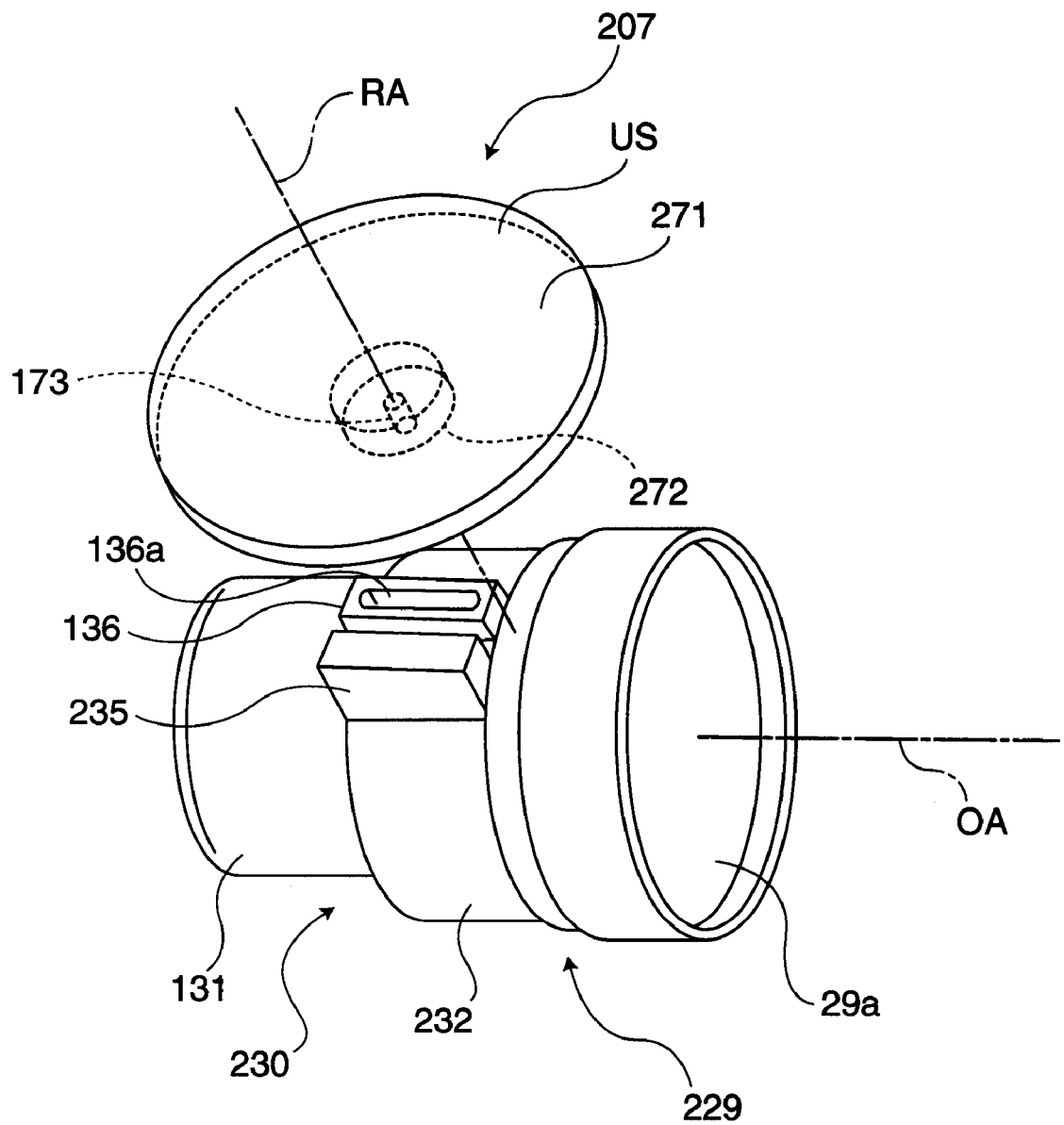
FIG. 8 is a perspective view showing a disassembled main part of a projector in a third embodiment.

FIG. 8 is a perspective view showing a part of a projector in a third embodiment. The projector in the third embodiment is a modification of the projector in the second embodiment. Thus, similar reference numerals are given to similar components and the same explanation of those is not repeated. The parts not particularly discussed in the projector of the third embodiment are the parts similar to those of the projector in the second embodiment.

A disk-shaped roller 272 is provided around the rotation axis RA on the back surface of a main body 271 of a turn table 207. The small cylindrical projection 173 is formed at the center of the roller 272. A friction engaging plate 235 extending in the direction of the optical axis OA and the guide groove member 136 having the groove 136a are provided on the side of a second cylindrical part 232 of a lens barrel 230. The roller 272 and the friction engaging plate 235 constitute a transmission mechanism for transmitting power in different directions. An elastic member having a large coefficient of friction such as rubber is affixed to the surface of the roller 272 and the side of the friction engaging plate 235. When the turn table 207 rotates, the roller 272 revolves around the rotation axis RA. By the rotation of the roller 272, the friction engaging plate 235 moves in the direction of the optical axis OA. Thus, by the rotation of the turn table 207 around the rotation axis RA which is perpendicular to the top surface US, the second cylindrical part 232 of the lens barrel 230 can be expanded and contracted relative to the first cylindrical part 131 in the direction of the optical axis OA.

The projection 173 provided on the back surface of the turn table 207 is guided by the groove 136a of the guide groove member 136 formed on the side of the second cylindrical part 232. In this embodiment, the projection 173 on the turn table 207 is fixed, and the guide member 136 smoothly slides in the direction of the optical axis OA. Therefore, the roller 272 and the friction engaging plate 235 come into contact with each other with pressure, thereby maintaining a condition where power is transmissible.

Similarly to the projectors in the above embodiments, the second cylindrical part 232 of the lens barrel 230 of the projector in the third embodiment can be expanded or contracted by the necessary amount in the direction of the distal end by means of the roller 272 and the friction engaging plate 235 when the turn table 207 rotatably embedded in the external case 4 is rotated. Accordingly, the focus condition of a projection lens 229 can be varied, and thus the focusing function can be performed using the turn table 207.

Fourth Embodiment

Figure 9:
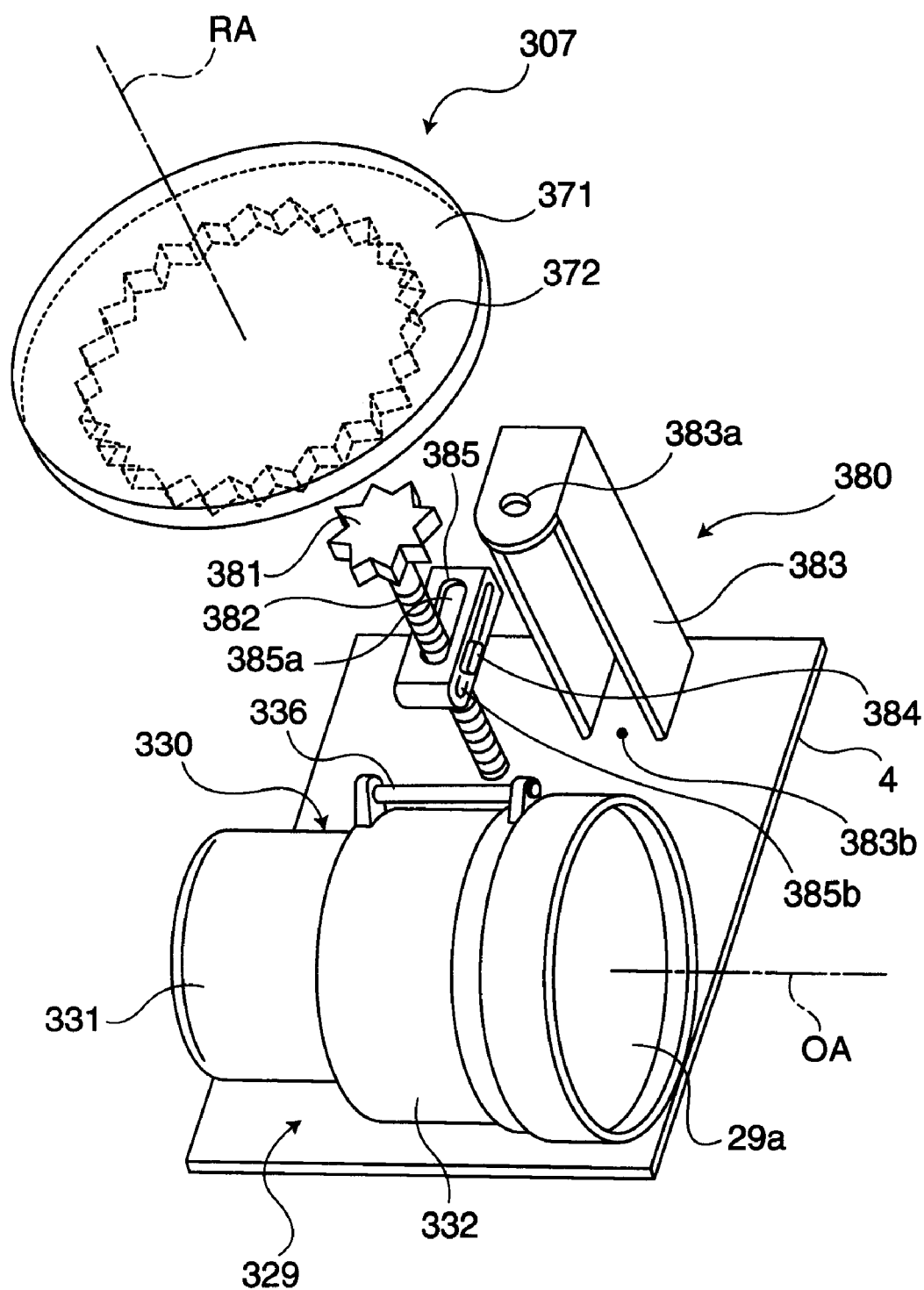
FIG. 9 is a perspective view showing a disassembled main part of a projector in a fourth embodiment.

FIG. 9 is a perspective view showing a part of a projector in a fourth embodiment. The projector in the fourth embodiment is a modification of the projector in the first embodiment. Thus, similar reference numerals are given to similar components and the same explanation of those is not repeated. The parts not particularly discussed in the projector of the fourth embodiment are the parts similar to those of the projector in the first embodiment.

According to this embodiment, a lens barrel 330 of a projection lens 329 expands and contracts a second cylindrical part 332 in the direction of the optical axis OA when the second cylindrical part 332 rotates around the optical axis OA with a first cylindrical part 331 fixed. For providing this mechanism, the first cylindrical part 331 has a male screw at an appropriate position of its side near the distal end, and the second cylindrical part 332 has a female screw at an appropriate position of its side near the root.

A gear 372 is provided around the rotation axis RA on the back surface of a main body 371 of a turn table 307. A guide bar 336 extending in the direction of the optical axis OA is equipped on the side of the second cylindrical part 332 of the lens barrel 330. A connection unit 380 is interposed between the gear 372 and the guide bar 336. The connection unit 380 has a gear 381 engaging with the gear 372 of the turn table 307, a bolt-shaped shaft 382 extending in the axial direction of the gear 381 for supporting the gear 381, a supporting member 383 for supporting the shaft 382 while allowing rotation of the shaft 382 around the axis, an up-down plate 384 moving upward and downward, having a female screw and engaging with the shaft 382, and a joint 385 accommodating the up-down plate 384 such that the up-down plate 384 can move in the horizontal direction and shifting upward and downward with the up-down plate 384. The upper end of the shaft 382 is supported by an opening 383a formed at the upper part of the supporting member 383 such that the shaft 382 can rotate. The lower end of the shaft 382 is supported by a supporting hole 383b formed on the bottom of the external case 4 such that the shaft 382 can rotate. The joint 385 has an elongate hole 385a extending in the lateral direction perpendicular to the optical axis OA. The elongate hole 385a allows the joint 385 to move in the direction perpendicular to the optical axis OA relative to the shaft 382. The joint 385 has a hole 385b extending in the lateral direction parallel to the optical axis OA. The guide bar 336 inserted through the hole 385b can slide in the direction of the hole 385b.

Figure 10:
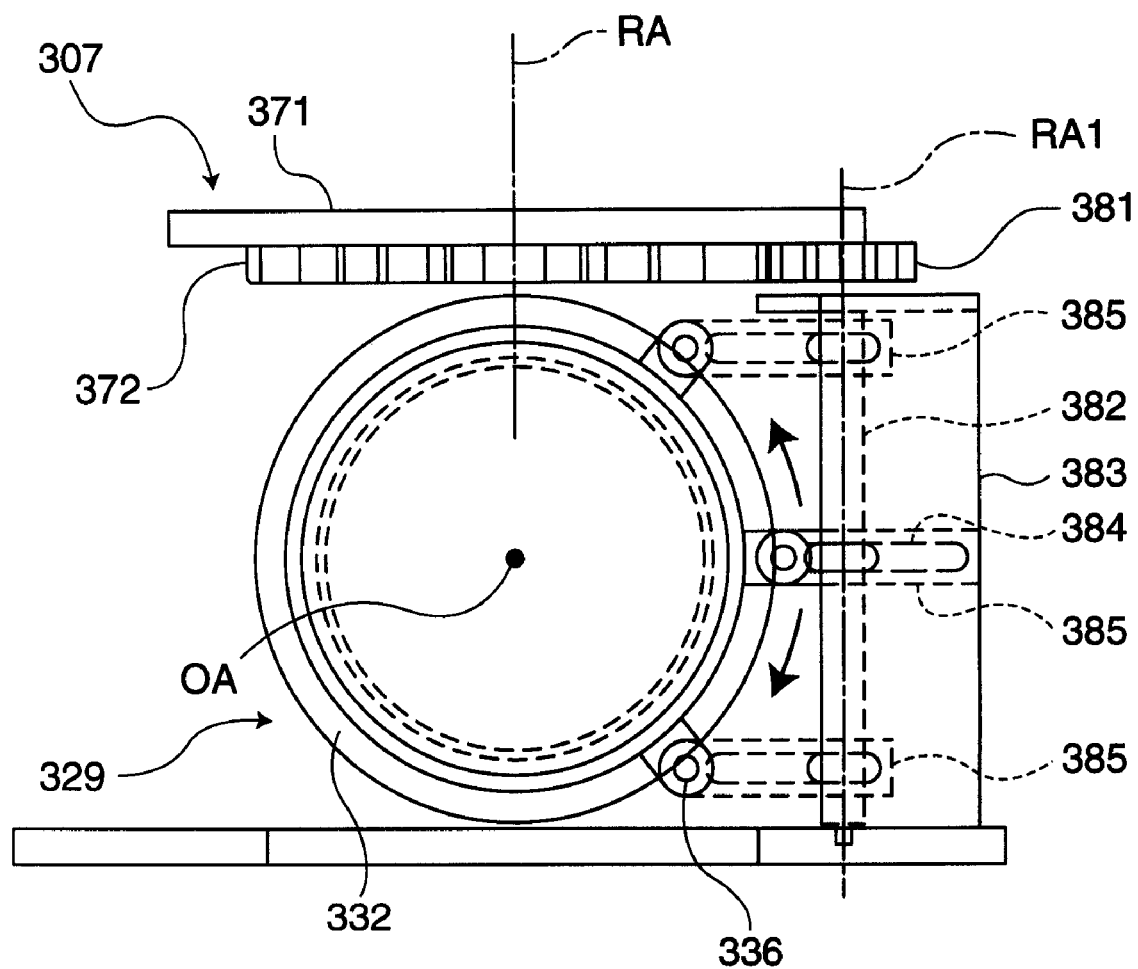
FIG. 10 is a front view illustrating operation of the projector shown in FIG. 9.

The operation of the projector is now described with reference to FIG. 10. When the turn table 307 rotates, the gear 372 revolves around the rotation axis RA. By the rotation of the gear 372, the gear 381 and the shaft 382 rotate around an axis RA1 parallel to the rotation axis RA. When the shaft 382 rotates in the normal and reverse directions, the up-down plate 384 and the joint 385 move upward and downward in accordance with the rotation of the shaft 382, and thus the guide bar 336 inserted through the joint 385 shifts upward and downward while maintaining its position. By this mechanism, the second cylindrical part 332 rotates around the optical axis OA so that it can shift around the optical axis OA.

Similarly to the projectors in the above embodiments, the second cylindrical part 332 of the lens barrel 330 of the projector in the fourth embodiment can be expanded or contracted by the necessary amount in the direction of the distal end by means of the connection unit 380 and the guide bar 336 when the turn table 307 rotatably embedded in the external case 4 is rotated. Accordingly, the focus condition of the projection lens 329 can be varied, and thus the focusing function can be performed using the turn table 307.

Fifth Embodiment

Figure 11:
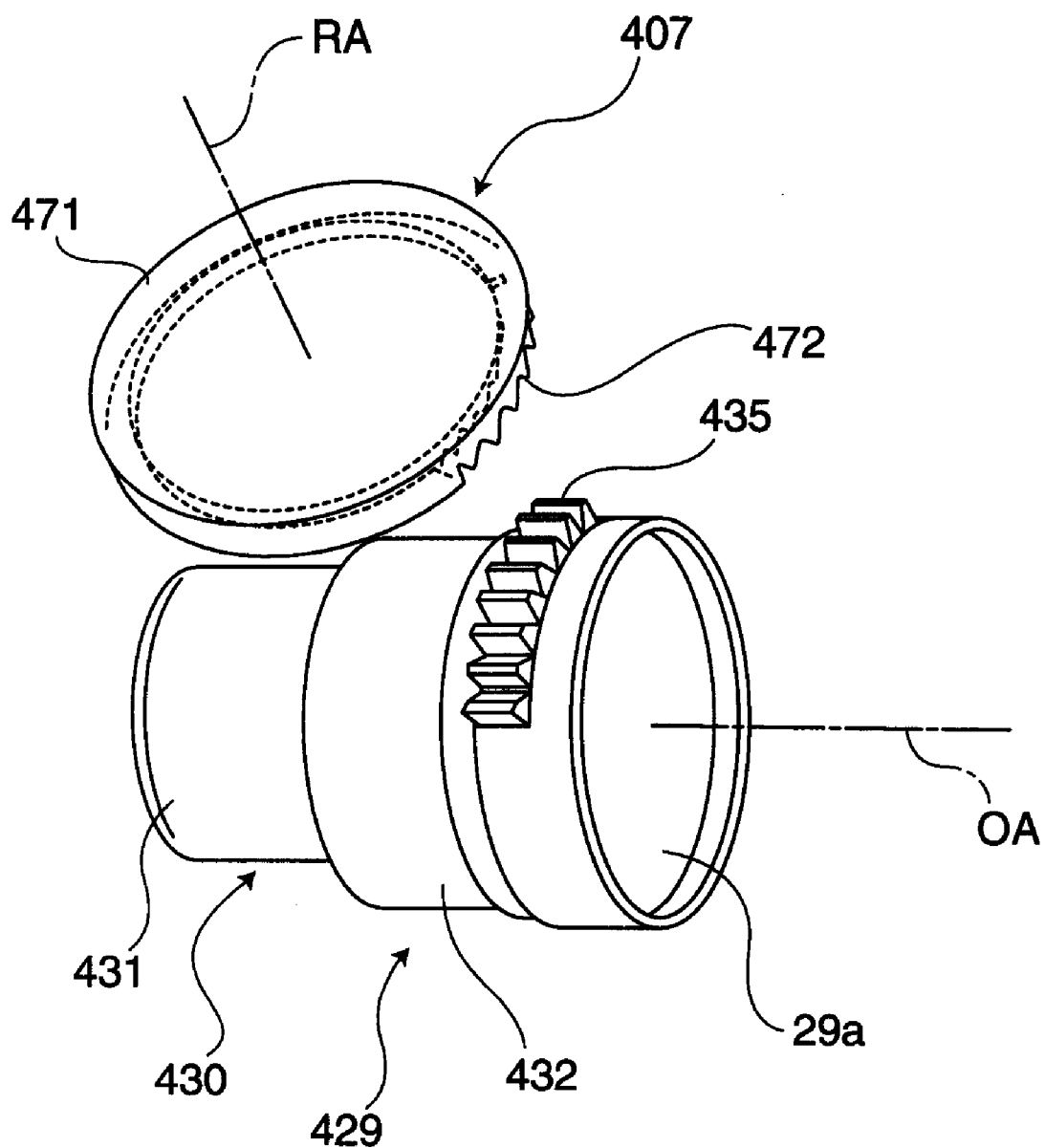
FIG. 11 is a perspective view showing a disassembled main part of a projector in a fifth embodiment.

FIG. 11 is a perspective view showing a part of a projector in a fifth embodiment. The projector in the fifth embodiment is a modification of the projector in the fourth embodiment. Thus, the parts not particularly discussed in the projector of the fifth embodiment are the parts similar to those of the projector in the fourth embodiment.

Similarly to the above embodiment, a lens barrel 430 of a projection lens 429 according to this embodiment expands and contracts a second cylindrical part 432 in the direction of the optical axis OA when the second cylindrical part 432 rotates around the optical axis OA with a first cylindrical part 431 fixed.

An annular projection is provided on the back surface of a main body 471 of a turn table 407 along its outer circumference. A first gear part 472 extending toward below is formed on a part of the annular projection. The center of the gear part 472 corresponds to the rotation axis RA of the turn table 407. A second cylindrical part 435 extending to the outside is provided on a part of the side of the second cylindrical part 432 of the lens barrel 430 along its circumference perpendicular to the optical axis OA. The first gear part 472 and the second gear part 435 engaging with each other for operation constitute a transmission mechanism as a gear system. When the turn table 407 rotates, the first gear part 472 rotationally shifts around the rotation axis RA. By the rotational shift of the first gear part 472, the second gear part 435 rotationally shifts around the optical axis OA. Thus, by rotation of the turn table 407 around the rotation shaft RA perpendicular to the top surface, the second cylindrical part 432 of the lens barrel 430 can be operated such that it expands or contracts in the direction of the optical axis OA relative to the first cylindrical part 431.

Similarly to the projectors in the above embodiments, the second cylindrical part 432 of the lens barrel 430 of the projector in the fifth embodiment can be expanded or contracted by the necessary amount in the direction of the distal end by means of the first and second gear parts 472 and 435 when the turn table 407 rotatably embedded in the external case 4 is rotated. Accordingly, the focus condition of the projection lens 429 can be varied, and thus the focusing function can be performed using the turn table 407.

Sixth Embodiment

Figure 12:
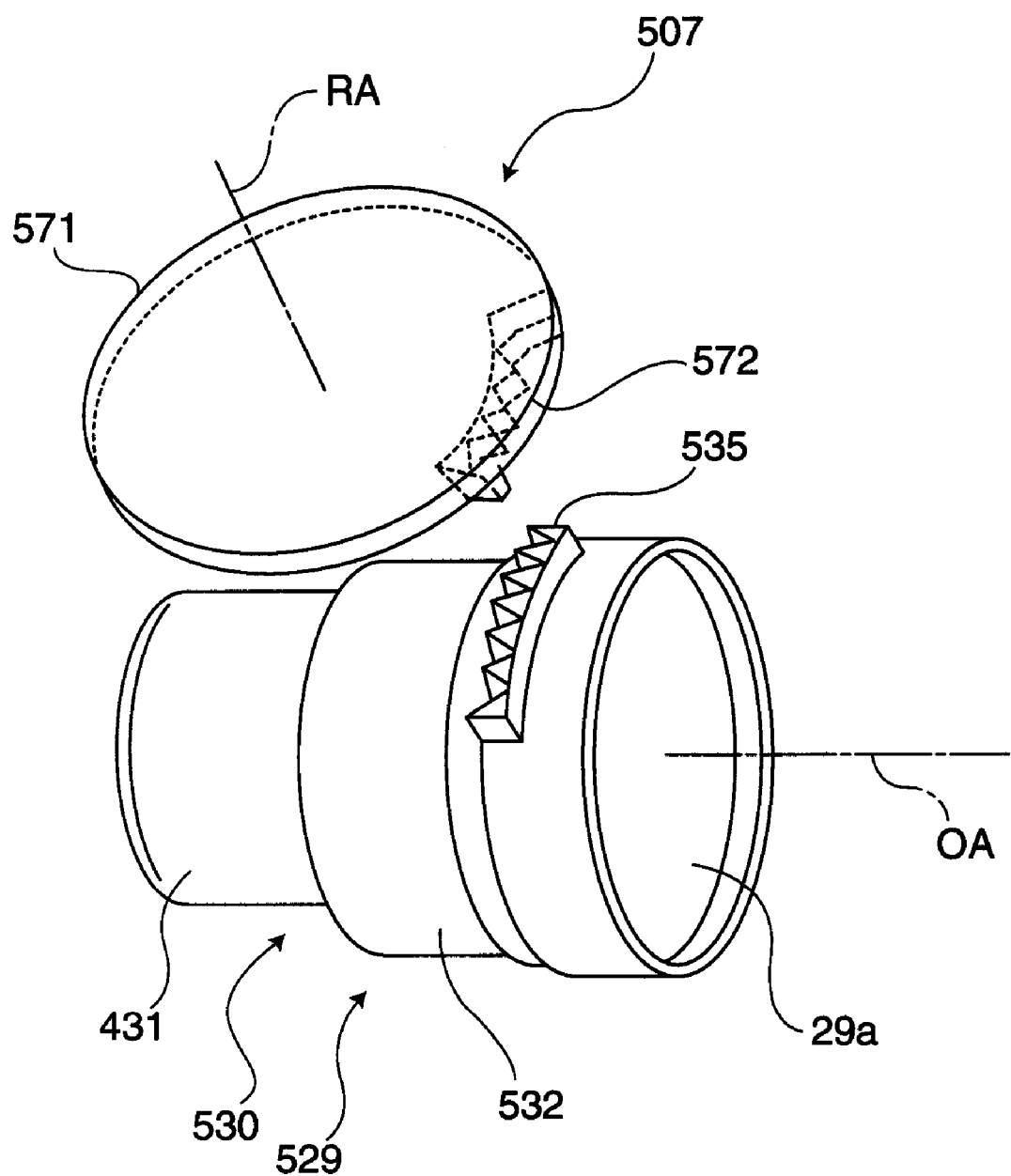
FIG. 12 is a perspective view showing a disassembled main part of a projector in a sixth embodiment.

FIG. 12 is a perspective view showing a part of a projector in a sixth embodiment. The projector in the sixth embodiment is a modification of the projector in the fifth embodiment. Thus, the parts not particularly discussed in the projector of the sixth embodiment are the parts similar to those of the projector in the fifth embodiment.

Similarly to the above embodiment, a lens barrel 530 of a projection lens 529 according to this embodiment expands and contracts a second cylindrical part 532 in the direction of the optical axis OA when the second cylindrical part 532 rotates around the optical axis OA with the first cylindrical part 431 fixed.

A projection is provided on a part of the back surface of a main body 571 of a turn table 507 along its outer circumference. A first gear part 572 extending to the outside in the circumferential direction is formed on the projection. The center of the gear part 572 corresponds to the rotation axis RA of the turn table 507. A second gear part 535 extending to the back in the direction of the optical axis OA is provided on a part of the side of the second cylindrical part 532 of a lens barrel 530 along its circumference perpendicular to the optical axis OA. The first gear part 572 and the second gear part 535 engaging with each other for operation constitute a transmission mechanism as a gear system. When the turn table 507 rotates, the first gear part 572 rotationally shifts around the rotation axis RA. By the rotation of the first gear part 572, the second gear part 535 rotationally shifts around the optical axis OA. Thus, by rotation of the turn table 507 around the rotation shaft RA perpendicular to the top surface, the second cylindrical part 532 of the lens barrel 530 can be operated such that it expands or contracts in the direction of the optical axis OA relative to the first cylindrical part 431.

Similarly to the projectors in the above embodiments, the second cylindrical part 532 of the lens barrel 530 of the projector in the sixth embodiment can be expanded or contracted by the necessary amount in the direction of the distal end by means of the first and second gear parts 572 and 535 when the turn table 507 rotatably embedded in the external case 4 is rotated. Accordingly, the focus condition of the projection lens 529 can be varied, and thus the focusing function can be performed using the turn table 507.

Seventh Embodiment

Figure 13:
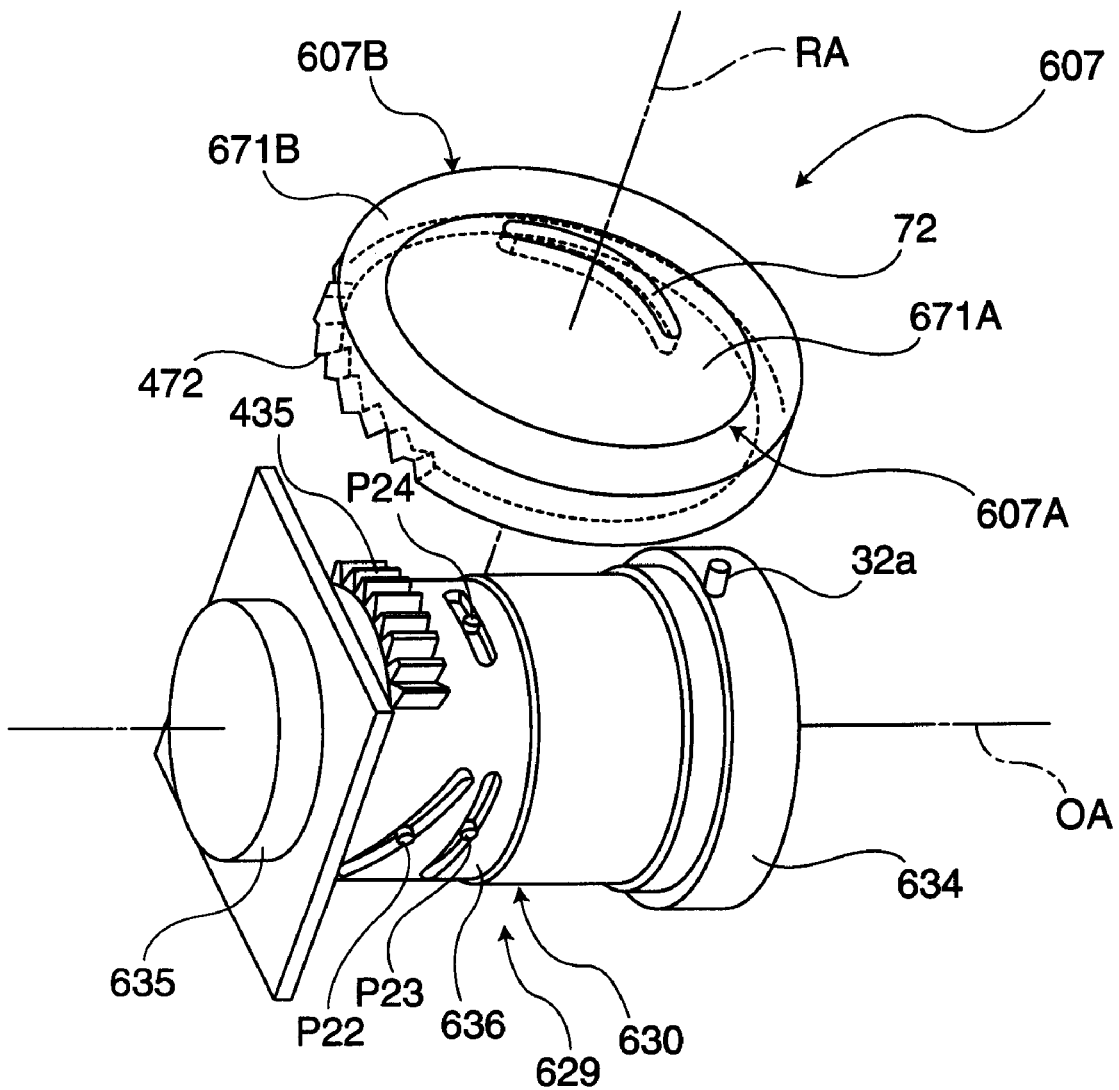
FIG. 13 is a perspective view showing a disassembled main part of a projector in a seventh embodiment.

FIG. 13 is a perspective view showing a part of a projector in a seventh embodiment. The projector in the seventh embodiment is a modification of the projector in the first embodiment. Thus, the parts not particularly discussed in the projector of the seventh embodiment are the parts similar to those of the projector in the first embodiment.

Figure 14:
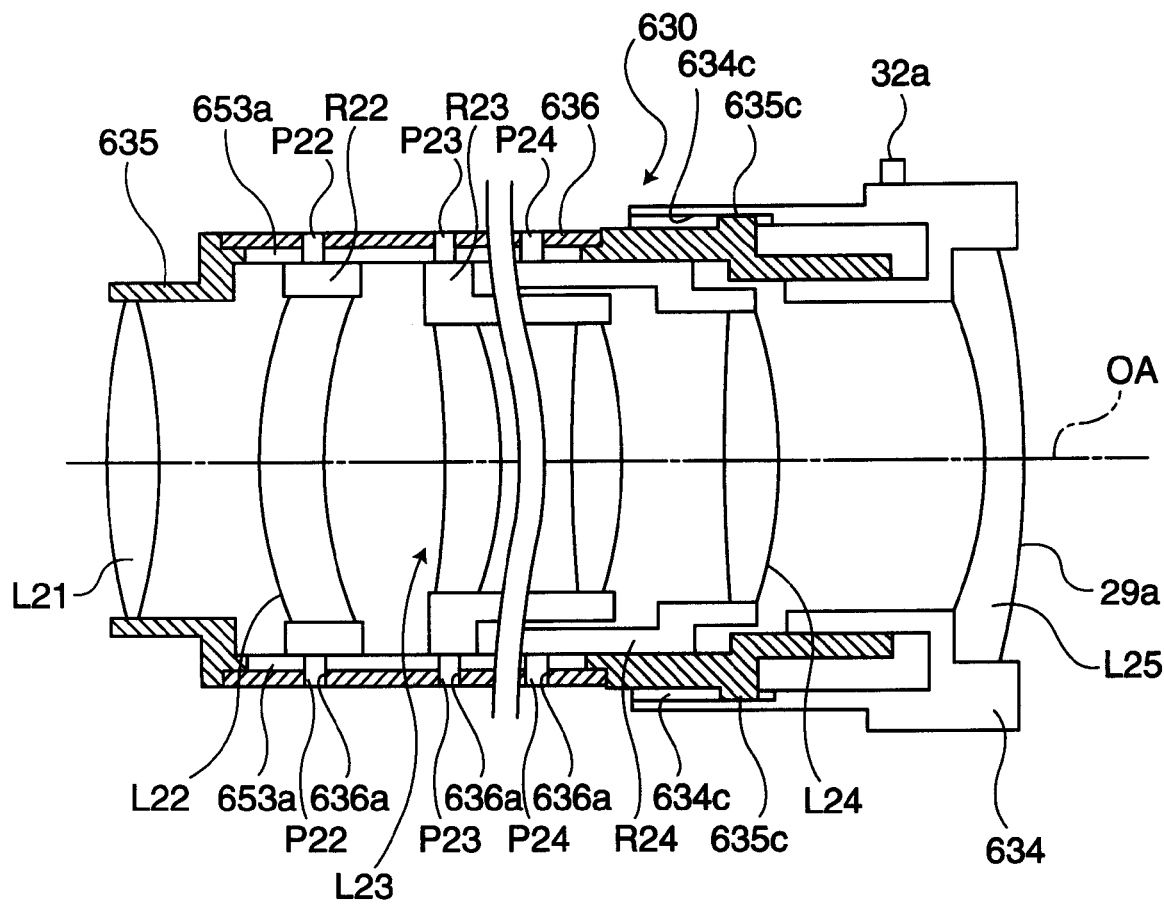
FIG. 14 is a side cross-sectional view illustrating an internal structure of a projection lens shown in FIG. 13.

In this embodiment, a projection lens 629 has not only the focusing function but also the zooming function. More specifically, as illustrated in the vertical cross-sectional view of FIG. 14, the projection lens 629 contains a plurality of lens groups L21 through L25 in a lens barrel 630. The lens groups L22 through L25 are movable in the direction of the optical axis within the lens barrel 630. The lenses constituting the first lens group L21 are fixed to the root of a lens barrel body 635, while the respective lenses constituting the second through fourth groups L22 through L24 are fixed to movable rings R22 through R24, respectively, which rings can slide in the direction of the optical axis OA within the lens barrel body 635. The lenses constituting the fifth lens group L25 are fixed to a straight-advancing cylinder 634 which is provided at the distal end of the lens barrel 635 and slides in the direction of the optical axis OA. A small cylindrical pin 32a is formed on a position of the outer circumference of the straight-advancing cylinder 634.

Cylindrical projections P22 through P24 extending to the outside in the radial direction are located at appropriate positions of the outer circumferences of the movable rings R22 through R24 which support the second through fourth lens groups L22 through L24, respectively. The cylindrical projections P22 through P24 extend into cam grooves 636a formed on a cam cylinder 636 via straight-advancing guide grooves 635a formed on a lens barrel body 635. Thus, when the cam cylinder 636 rotates around the optical axis OA, the respective positions of the projections P22 through P24, i.e., the second through fourth lens groups L22 through L24 guided by the straight-advancing grooves 635a of the lens barrel body 635 and movable in the direction of the optical axis OA are controlled in the direction of the optical axis OA by the cam grooves 636a of the cam cylinder 636. Thus, the zooming operation can be performed in accordance with the patterns of the cam grooves 636a. The change of magnification using the projection lens 629 is executed by a method similar to the method disclosed in JP-A-2001-194572, and the detailed explanation of this method is not repeated herein.

Projections 635c extending in the direction of the optical axis OA are provided at two positions opposed to each other on the outer circumference of the distal end of the lens barrel body 635. A pair of long and narrow grooves 634c extending in the optical axis and having a constant depth and width are formed at the positions corresponding to the projections 635c on the inner circumference of the straight-advancing cylinder 634. The projections 635c of the lens barrel body 635 smoothly slide in the direction of the optical axis OA while guided by the grooves 634c of the straight-advancing cylinder 634. Thus, while the straight-advancing cylinder 634 is shifted toward the distal and or the root relative to the lens barrel body 635, the position of the straight-advancing cylinder 634 is maintained without rotation of the cylinder 634 around the optical axis OA. Accordingly, the pin 32a can be maintained at the upper position all the time.

In this structure, the straight-advancing cylinder 634 corresponds to a focus varying section for varying the focus condition of the projection lens 629. The cam cylinder 636 and the movable rings R22 through R24 correspond to a magnification varying section for varying the projection magnification of the projection lens 629.

Returning to FIG. 13, the turn table 607 has a disk-shaped central member 607A disposed at the center and an annular outer member 607B disposed on the outer circumference. Thus, the turn table 607 has a disk-shaped external entire appearance. The central member 607A can rotate around the rotation axis RA relative to the outer member 607B. Therefore, the central member 607A and the outer member 607B can separately rotate around the rotation axis RA by the operation of the user.

The central member 607A has a structure similar to that of the turn table 7 in the first embodiment, and has the curved elongate hole 72 on a main body 671A. The elongate hole 72 has a function of a guide groove which guides the pin 32a by supporting the pin 32a formed on the straight-advancing cylinder 634 such that the pin 32a can slide within the guide groove. The outer member 607B has a structure similar to that of the turn table 407 incorporated in the projector in the fifth embodiment shown in FIG. 11, and has the first gear part 472 extending toward below on the back surface of the main body 671B. The second gear part 435 extending to the outside in the circumferential direction is formed at the position corresponding to the first gear part 472 on the side of the cam cylinder 636.

The operation of the projector in this embodiment is now described. When the central member 607A rotatably embedded in the external case 4 rotates around the rotational axis RA, the straight-advancing cylinder 634 of the lens barrel 630 expands or contracts by the necessary amount in the direction of the distal end by means of the elongate hole 72 and the pin 32a. Accordingly, the focusing condition of the projection lens 629 can be varied, and thus the focusing function can be performed using the turn table 607.

When the outer member 607B rotatably embedded in the external case 4 rotates around the rotation axis RA, the cam cylinder 636 of the lens barrel 630 appropriately rotates by the transmission of the first and second gear parts 472 and 435. As a result, the respective second through fourth lens groups L22 through L24 shift by appropriate amounts in the direction of the optical axis OA. Accordingly, the magnification of images produced by the projection lens 629 can be varied, and thus the zooming function can be performed using the turn table 607.

Eighth Embodiment

Figure 15:
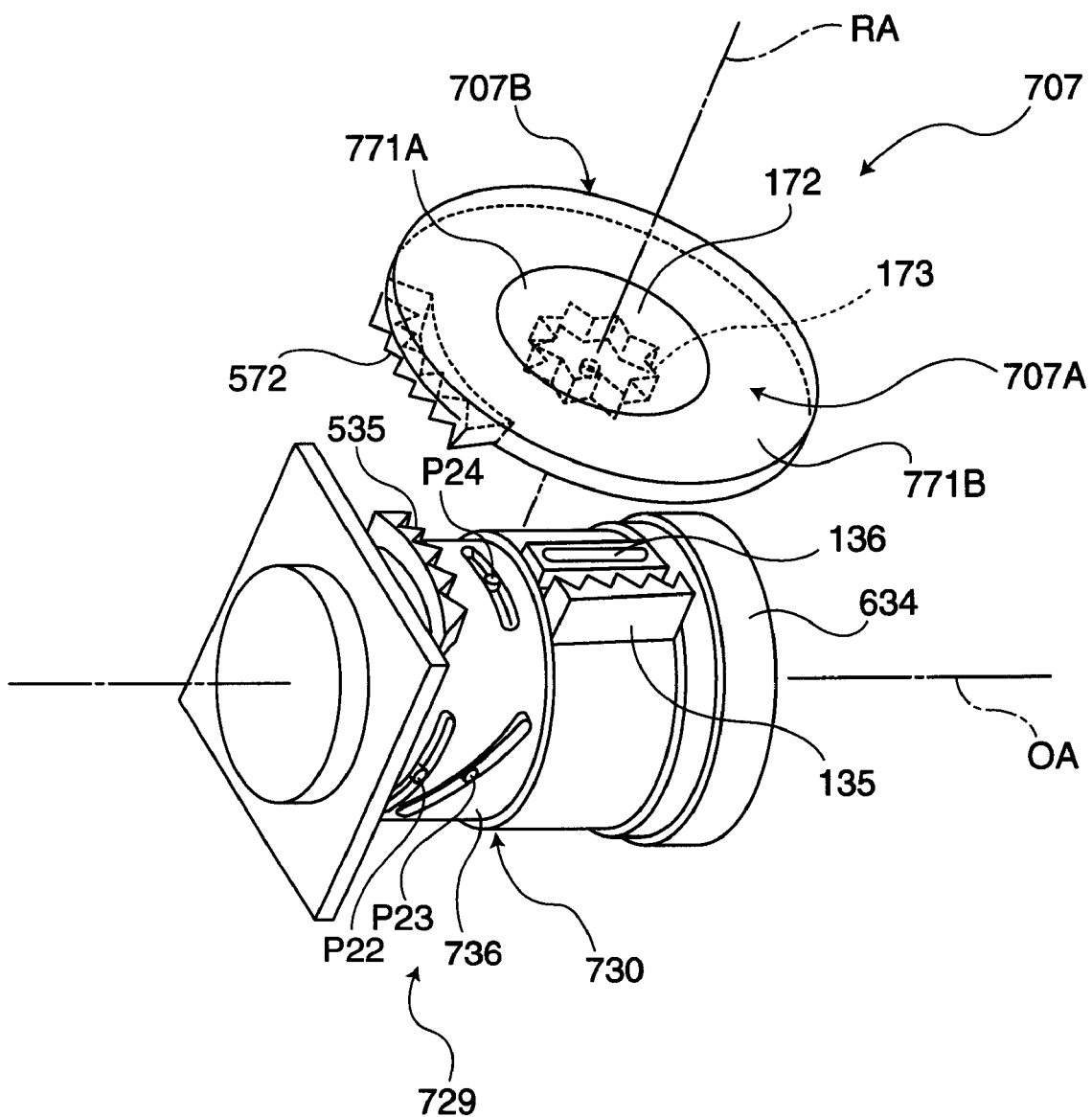
FIG. 15 is a perspective view showing a disassembled main part of a projector in an eighth embodiment.

FIG. 15 is a perspective view showing a part of a projector in an eighth embodiment. The projector in the eighth embodiment is a modification of the projector in the seventh embodiment. Thus, the parts not particularly discussed in the projector of the eighth embodiment are the parts similar to those of the projector in the seventh embodiment.

Similar to the above embodiment, a projection lens 729 can perform not only the focusing function but also the zooming function. Thus, the internal structure of the projection lens 729 is similar to that of the projection lens 629 shown in FIG. 14.

A turn table 707 has a central member 707A disposed at the center and an outer member 707B disposed on the outer circumference. The respective members 707A and 707B can separately rotate around the rotation axis RA by the operation of the user.

The central member 707A has a structure similar to that of the turn table 107 in the second embodiment, and has the pinion 172 on the back surface of a main body 771A. The projection 173 is formed at the center of the pinion 172. The pinion 172 engages with the rack 135 formed on the straight-advancing cylinder 634, and the projection 173 engages with the guide groove member 136 provided on the straight-advancing cylinder 634. The outer member 707B has a structure similar to that of the turn table 507 incorporated in the projector in the sixth embodiment shown in FIG. 12, and has the first gear part 572 extending to the outside in the circumferential direction on the back surface of a main body 771B. The second gear part 535 extending to the front in the direction of the optical axis OA on the side of a cam cylinder 736 at the position corresponding to the first gear part 572.

The operation of the projector in this embodiment is now described. When the central member 707A rotatably embedded in the external case 4 rotates around the rotational axis RA, a straight-advancing cylinder 734 of a lens barrel 730 expands or contracts by the necessary amount in the direction of the distal end by means of the pinion 172 and the rack 135. Accordingly, the focusing condition of the projection lens 729 can be varied, and thus the focusing function can be performed using the turn table 707.

When the outer member 707B rotatably embedded in the external case 4 rotates around the rotation axis RA, the cam cylinder 736 of the lens barrel 730 appropriately rotates by the transmission of the first and second gear parts 572 and 535. As a result, the plural lens groups contained in the projection lens 729 separately shift by appropriate amounts in the direction of the optical axis OA. Accordingly, the magnification of images produced by the projection lens 729 can be varied, and thus the zooming function can be performed using the turn table 707.

Ninth Embodiment

Figure 16:
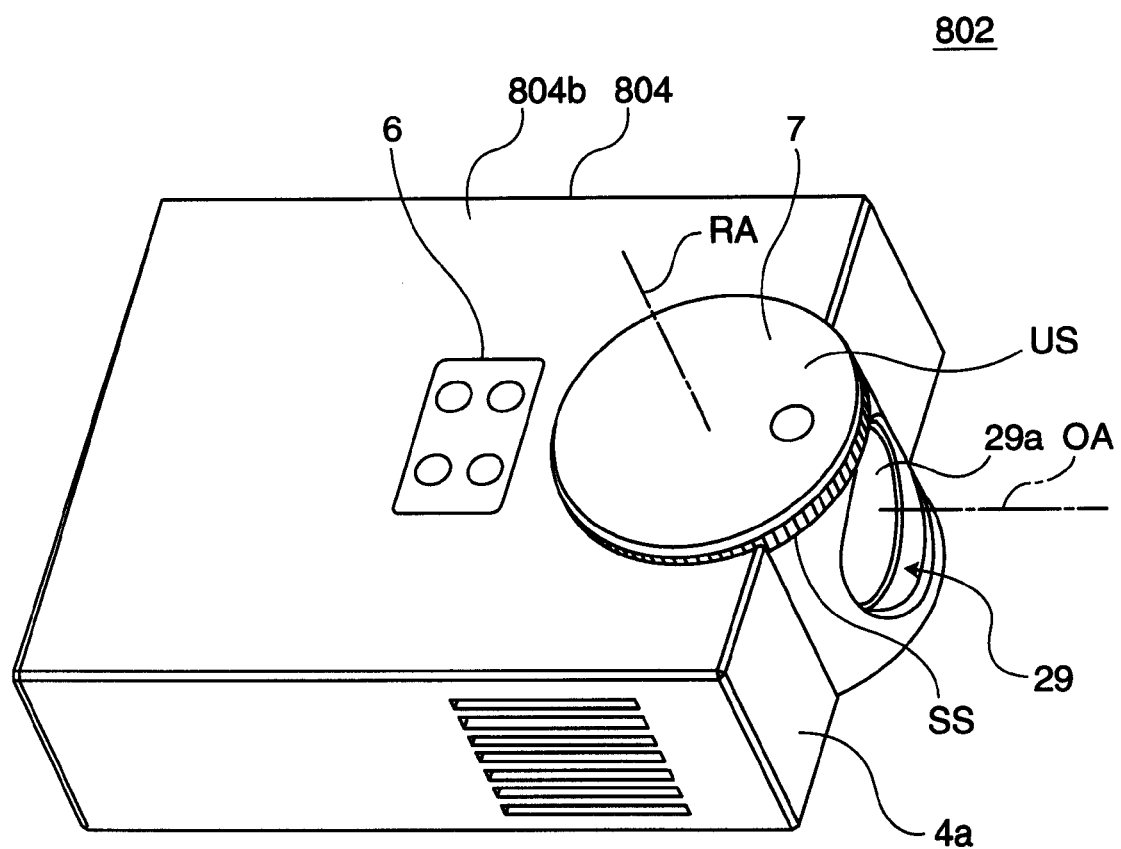
FIG. 16 is a perspective view showing a disassembled main part of a projector in a ninth embodiment.

FIG. 16 is a perspective view showing a part of a projector in a ninth embodiment. The projector in the ninth embodiment is a modification of the projector in the first embodiment. Thus, the parts not particularly discussed in the projector of the ninth embodiment are the parts similar to those of the projector in the first embodiment.

According to this embodiment, the turn table 7 is attached to a top board 804b of an external case 804 in a projector 802 such that the turn table 7 is almost embedded in the top board 804b near the front surface 4a. Thus, the entire top surface US and a part of a side surface SS are exposed to the outside. The turn table 7 is supported by the top board 804b by the method similar to that of the first embodiment, and is rotatable around the rotation axis RA within a plane parallel to the top board 804b. The user can rotate the turn table 7 using the top surface US or the side surface SS, and thus can shift the movable part of the projection lens 29 in the direction of the optical axis OA by the rotation of the turn table 7. Accordingly, the focus condition of the projection lens 29 can be controlled.

The external case 804 which has the turn table 7 including the entire part of the top surface US and the certain part of the side surface SS both exposed to the outside in the ninth embodiment can be used in the structures for performing the focusing and zooming functions as in the seventh and eighth embodiments.

The invention is not limited to the embodiments described and depicted herein, but various modifications and changes may be given to the invention without departing from the scope and spirit of the invention. For example, modifications described below may be employed.

While the projectors in the seventh and eighth embodiments use the transmission mechanism in the first embodiment shown in FIG. 5 and the transmission mechanism in the second embodiment shown in FIG. 7 for focusing, other transmissions such as those in the third embodiment shown in FIG. 8, in the fifth embodiment shown in FIG. 11 and in the sixth embodiment shown in FIG. 12 may be employed instead of the transmission mechanisms in the first and second embodiments. Also, while the projectors in the seventh and eighth embodiments use the transmission mechanism in the fifth embodiment shown in FIG. 11 and the transmission mechanism in the sixth embodiment shown in FIG. 12 for zooming, other transmissions such as those in the first embodiment shown in FIG. 5, in the second embodiment shown in FIG. 7, and in the third embodiment shown in FIG. 8 may be employed instead of the transmission mechanisms in the fifth and sixth embodiments. In these cases, either the central member or the outer member constituting the turn tables 607 and 707 is used for focusing, and the other is used for zooming.

In the above embodiments, the turn tables 7, 107, 207, 307, 407, 507, 607 and 707 are supported by the external case 4 or 804. However, these turn tables 7 through 707 may be supported by shafts.

While the turn tables 7, 107, 207, 307, 407, 507, 607 and 707 in the above embodiments are manually rotated, they can be rotated automatically. In this case, a distance measuring mechanism and a focusing motor are equipped to drive the focusing motor based on data measured by the distance measuring mechanism, and the driving force generated by the focusing motor is transmitted to the turn tables 7, 107, 207, 307, 407, 507, 607 and 707.

The structure of the optical system to which the invention is applied is not limited to the structure disclosed herein. For example, in the above embodiments, the light source device 21 is constituted by the light source lamp 21a, the pair of the fly-eye optical systems 21d and 21e, the polarization conversion member 21g, and the superposing lens 21i. However, the fly-eye optical systems 21d and 21e, the polarization conversion member 21g and other components may be eliminated, and the light source lamp 21a may be replaced with other light sources such as LED.

The invention is applicable to optical systems which use a reflection-type light valve for the light modulation unit instead of the transmission-type light valve used herein. The light valve is not limited to the type using the liquid crystal device.

In the above embodiments, lights in respective colors are modulated by the light modulation unit 25 after color separation of illumination light using the color separation optical system 23, and images in the respective colors are synthesized by the cross dichroic prism 27. However, images may be produced by a single liquid crystal panel without using the color separation optical system 23. Alternatively, the three liquid crystal light valves may be separately illuminated instead of using the color separation optical system 23.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

The entire disclosure of Japanese Patent Application No. 2006-42016, filed Feb. 20, 2006 is expressly incorporated by reference herein.

What is claimed is:

1. A projector, comprising:
   an image forming device;
   a projection lens for projecting an image produced by the image forming device; and
   an external case which accommodates the image forming device and at least a part of the projection lens, and has an opening through which a light emission end of the projection lens is exposed, wherein:
   the projection lens has a lens barrel and a plurality of lenses equipped within the lens barrel;
   the lens barrel has a fixed part and a movable part; and
   a turn table for shifting the movable part of the lens barrel in the direction of the optical axis of the projection lens is provided;
   the direction of the rotation axis of the turn table is substantially perpendicular to the optical axis of the projection lens; and
   the top surface of the turn table is exposed through the outer surface of the external case.

2. The projector according to claim 1, wherein the movable part varies the focus condition of the projection lens.

3. The projector according to claim 1, wherein the movable part varies the projection magnification of the projection lens.

4. The projector according to claim 1, wherein:
   the movable part has a focus varying section for varying the focus condition of the projection lens and a magnification varying section for varying the projection magnification of the projection lens; and
   the turn table has a first part for shifting the focus varying section and a second part for shifting the magnification varying section.

5. The projector according to claim 1, wherein the top surface of the turn table is exposed through the top board of the external case.

6. The projector according to claim 1, wherein a transmission mechanism for transmitting the rotation of the turn table to the movable part is provided between the turn table and the movable part.

7. The projector according to claim 6, wherein the transmission mechanism is a guiding mechanism including a guide pin fixed to the movable part of the lens barrel and a guide groove formed on the turn table and allowing the guide pin to slide within the guide groove.

8. The projector according to claim 6, wherein the transmission mechanism is a gear mechanism including a first gear part provided on the movable part of the lens barrel and a second gear part provided on the turn table.

\* \* \* \* \*